United States Patent [19]

Narang

[11] Patent Number: 4,689,896

[45] Date of Patent: Sep. 1, 1987

[54] CLOTHES DRYER AND LAUNDRY SYSTEM

[76] Inventor: Rajendra K. Narang, 1525 Bonnie Rd., Macedonia, Ohio 44056

[21] Appl. No.: 561,882

[22] Filed: Dec. 15, 1983

[51] Int. Cl.[4] ............................................. F26B 11/04
[52] U.S. Cl. .......................................... 34/82; 34/133; 34/134; 34/138
[58] Field of Search ..................... 34/54, 82, 133, 134, 34/135, 48; 68/18 F, 20, 144

[56] References Cited

U.S. PATENT DOCUMENTS

| | | | |
|---|---|---|---|
| 2,024,062 | 12/1935 | Preedit | 34/134 |
| 2,878,581 | 3/1959 | Turati | 34/92 |
| 3,081,554 | 3/1963 | Long | 34/82 |
| 3,254,423 | 6/1966 | Ruelle | 34/54 |
| 3,639,998 | 2/1972 | Mason | 34/82 |
| 3,718,982 | 3/1973 | Deaton | 34/82 |
| 3,816,070 | 6/1974 | Candor | 34/133 |
| 3,969,070 | 7/1976 | Thompson | 34/86 |
| 4,086,707 | 5/1978 | Bochan | 34/54 |
| 4,204,339 | 3/1980 | Muller | 68/20 |
| 4,227,315 | 10/1980 | Hight | 34/82 |
| 4,236,320 | 12/1980 | Schwadike et al. | 34/133 |
| 4,237,621 | 12/1980 | Boismenu | 34/133 |

FOREIGN PATENT DOCUMENTS 109264 12/1943 Sweden ................................ 34/138

Primary Examiner—Albert J. Makay
Assistant Examiner—David W. Westphal
Attorney, Agent, or Firm—Renner, Otto, Boisselle & Lyon

[57] ABSTRACT

An improved clothes dryer characterized by a diffuser located inside the dryer drum for receiving heated air flow and directing the same towards and into intimate contact with wet clothing in the drum at a plurality of locations spaced along the axial length of the drum. Also provided is a dryer temperature control system operative to control the temperature in the dryer drum by maintaining a desired preselected temperature on a steady state basis and/or by varying the rate of air flow through the dryer drum; a clogged filter detector operative to generate an output signal indicating a clogged filter in response to the rate of forced air flow through the dryer dropping below a predetermined minimum acceptable level, and a laundry system wherein hot dry attic air is supplied to the dryer while the hot dryer exhaust and drain water from a washer is used to preheat water in a storage tank prior to such water being supplied to a hot water heater.

14 Claims, 11 Drawing Figures

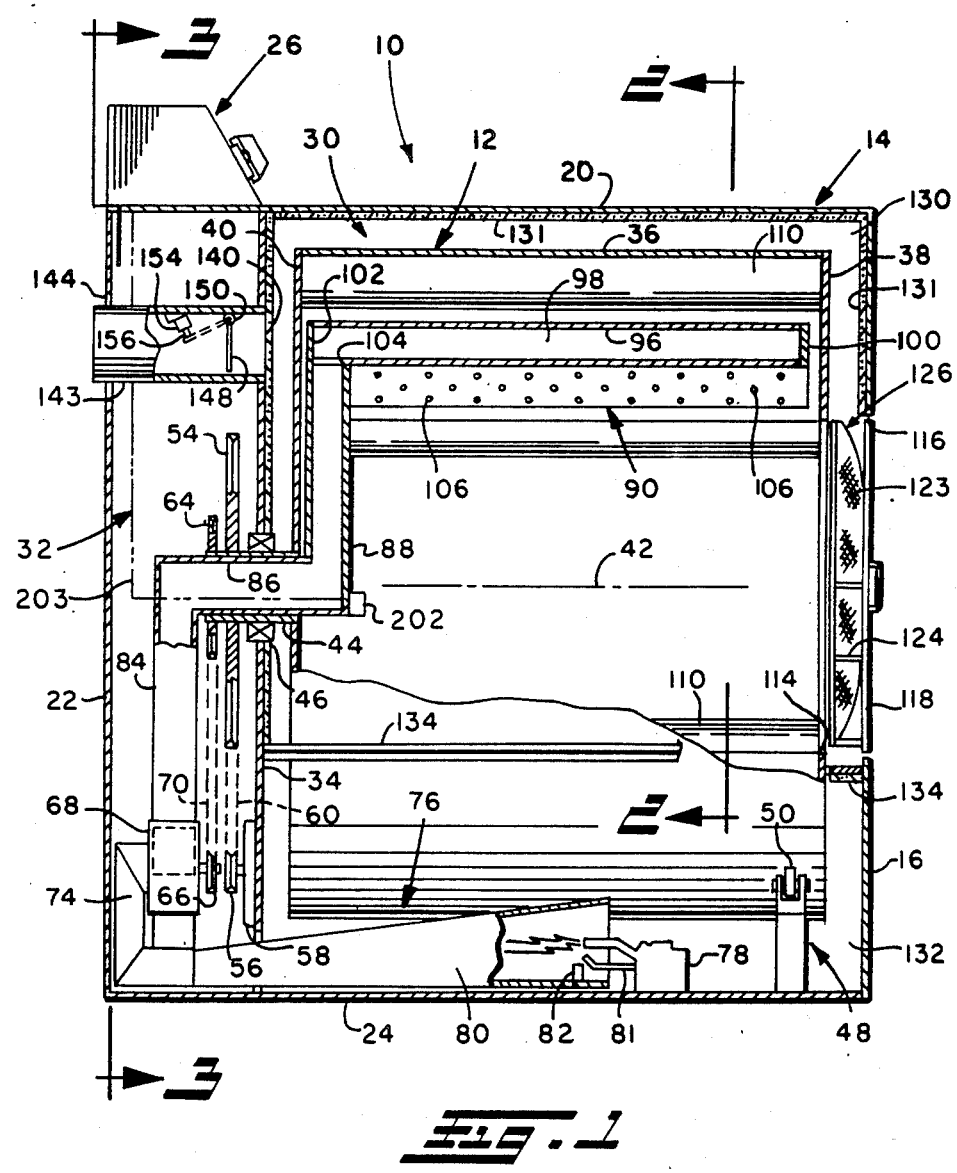

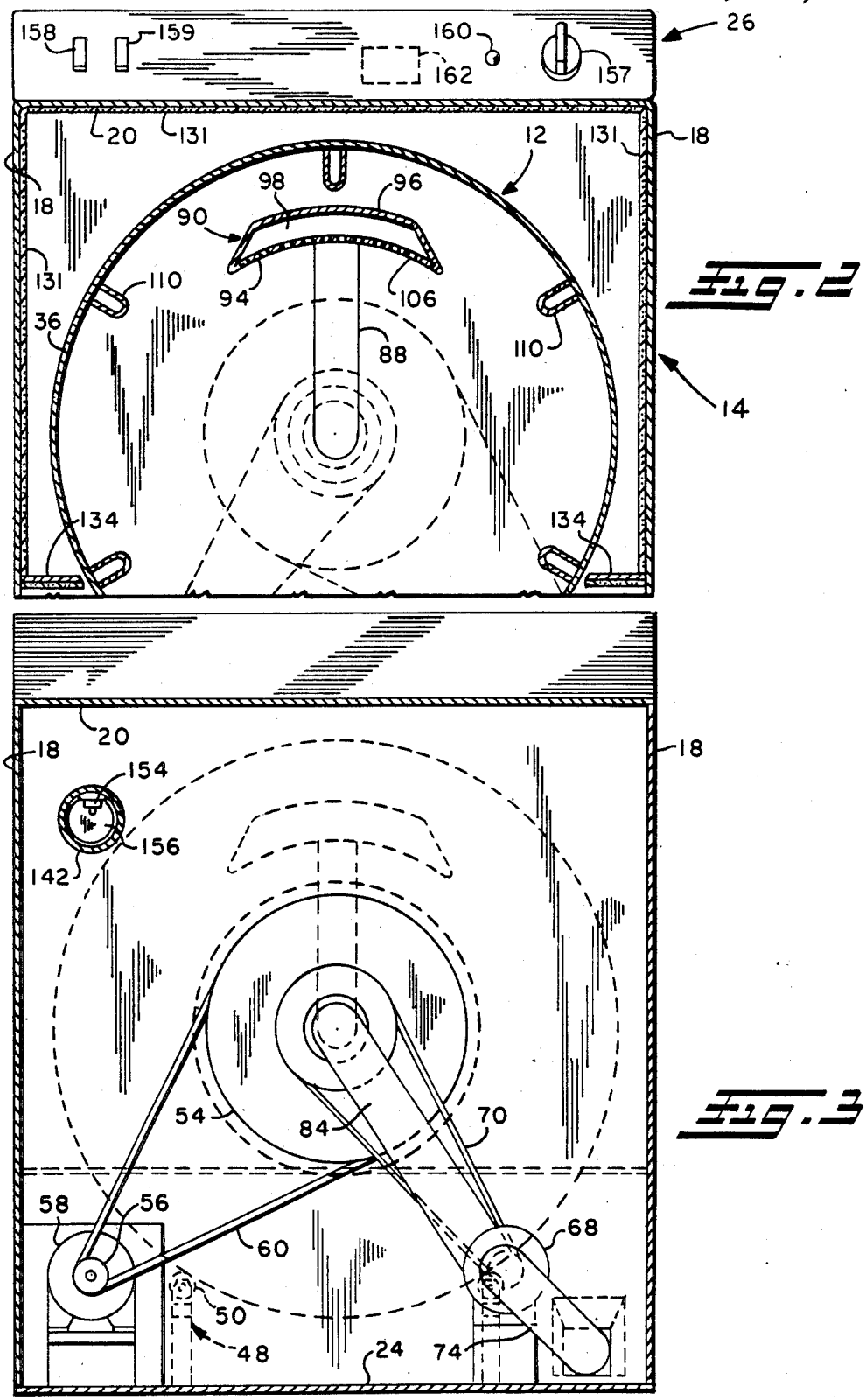

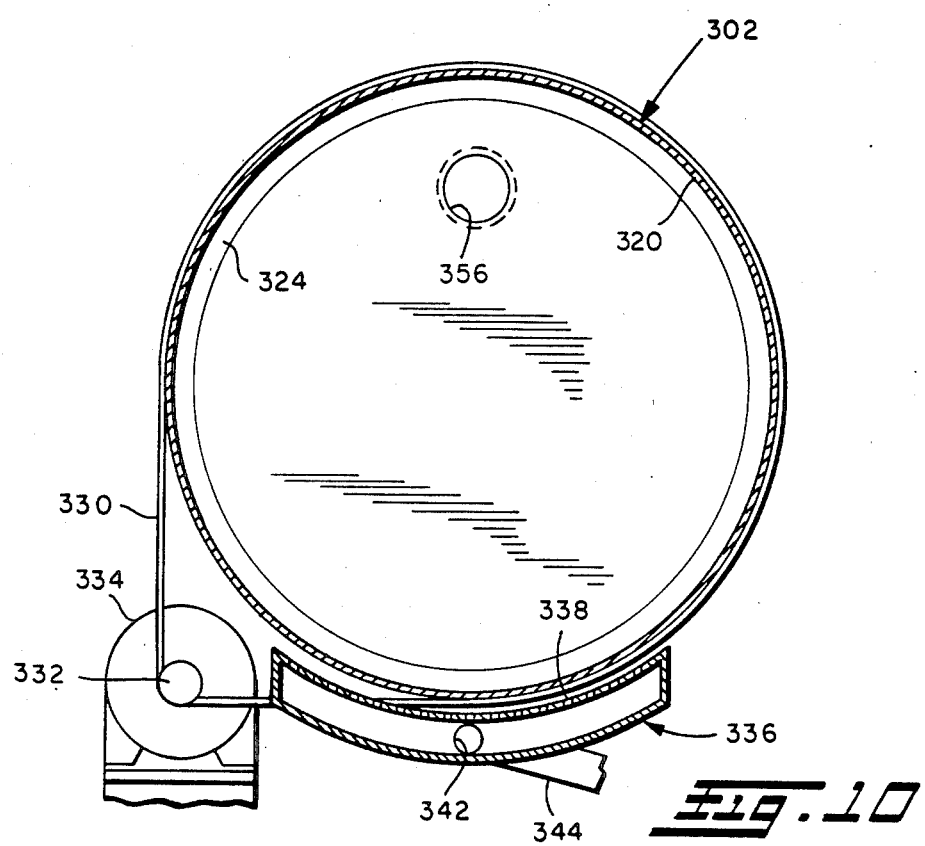
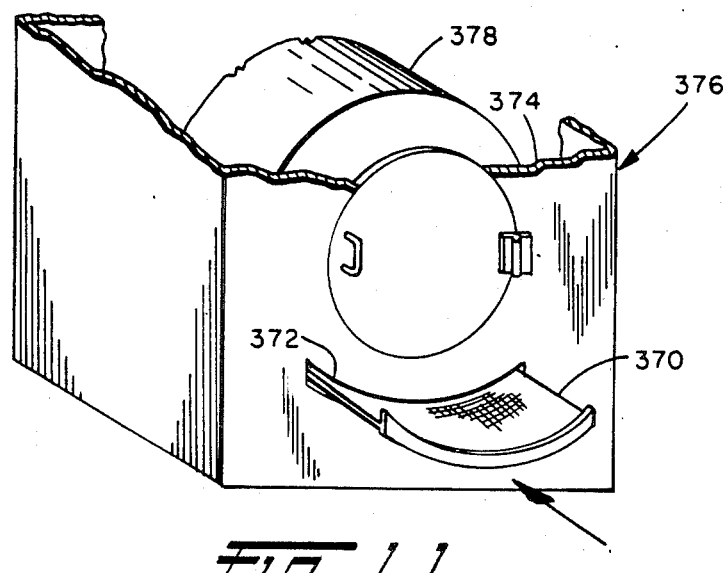

CLOTHES DRYER AND LAUNDRY SYSTEM

This invention relates generally to clothes dryers and laundry systems and, more particularly, to improvements therein which render clothes drying and laundry operations more energy efficient.

BACKGROUND

Domestic clothes dryers typically employ a cylindrical basket or drum mounted in a housing for rotation about its horizontal axis. At its front end, the drum is open to a port in the cabinet of the dryer which may be opened and closed by a hinged door. The drum is rotated, usually by an electric motor and belt drive, to tumble wet clothing that has been placed therein, and such tumbling action may be facilitated by one or more baffles circumferentially arranged about and fixed to the inside cylindrical wall of the drum. As the wet clothes are tumbled, heated air is passed through the drum to promote evaporation.

In some dryers, the entire periphery of the drum is perforated to allow heated air to directly enter the drum from an enclosed outer casing. In other dryers, a perforated inlet area may be at the front or rear end of the drum, and such drum revolves in a full or partial casing that has an inlet opening and an outlet opening either at opposite sides thereof or at the same side in spaced relation.

Domestic clothes dryers typically draw air from the room in which they are located and exhaust the moisture-laden air exiting the drum through a vent duct to the outside of the home. If the dryer is located in an air-conditioned or heated environment, a significant quantity of the preconditioned air would be lost during operation of the dryer and would require replacement by unconditioned air drawn from the outside. Another common practice has been to exhaust the moisture-laden air back into the room, particularly during the winter months, for heat reclamation and humidifying purposes, and many convenience devices have been provided for this purpose. This however may be undesirable for a number of reasons, one being the possibility of damage to or premature failure of various dryer components such as the electric motor and controls therefor due to the resultant high humidity in the dryer's immediate environment. In addition, the resultant recycling of moisture-laden air will lengthen the drying time in view of its lessened ability to extract moisture from wet clothing being dried.

In gas clothes dryers, the utilized burner is often of the single port type which directs the burner flame into a tube where the hot combustion products mix with dilution air. The thusly heated air is then drawn through and exhausted from the drum by a blower which may be driven by the same motor driving the drum. The temperature of the exhausted air is monitored by a thermostat which cycles a gas control valve between on and off positions indirectly to maintain the clothing temperature within a preselected safe range.

Most if not all dryers, whether gas or electric, employ a filter or lint trap to remove entrained lint from the air exiting the drum. From time to time, the filter must be removed and cleaned of trapped lint to ensure proper air flow and operation of the dryer. For obvious reasons, a clogged filter will adversely affect the dryer's performance and efficiency. Heretofore, it has been the responsibility of the operator to check the filter which may require removal of the filter for visual inspection. If the operator forgets, the dryer might then be operated at less than peak efficiency or possibly with damaging results.

SUMMARY OF THE INVENTION

The present invention provides a number of improvements in clothes dryers which serve to improve dryer performance and efficiency. According to one feature of the invention, an improved clothes dryer includes a diffuser located inside the dryer drum for receiving heated air flow and directing the same towards and into intimate contact with wet clothing in the drum at a plurality of locations spaced along the axial length of the drum. The diffuser may be in the form of an arcuate plenum disposed in the upper interior part of the drum which as an inlet at one end for receiving the heated air and a plurality of downwardly directed outlets spaced along its axial length. In another form, the diffuser may include at least one and preferably a plurality of axially elongate hollow baffles circumferentially arranged about the inside wall of the drum, each baffle having a heated air inlet at one end and a plurality of inwardly directed outlets spaced along its axial length. The baffles may be fixed to the drum for common rotation or selectively rotated about the axis of a stationary or oppositely rotating drum to effect the desired tumbling action of the wet clothing.

According to another feature of the invention, a regulator is employed to proportionally modulate the heat input rate of the air heater, whether gas or electric, in response to sensed temperature conditions inside the drum or drying chamber. Accordingly, the regulator is operative to maintain a desired preselected temperature in the drying chamber on a steady state basis. Alternatively or additionally, a multi-speed or variable speed blower is utilized to control drying temperature and provide improved overall drying efficiency.

The present invention also provides a clogged filter detector which generates an output signal indicating a clogged filter condition that may be used to disable drying operation until the filter is cleaned or simply to indicate visually or audibly that the filter requires cleaning. The detector is responsive to the rate of forced air flow through the dryer and operates to indicate a clogged filter or other air flow obstruction when the flow rate drops below a predetermined minimum acceptable level.

Further in accordance with the invention, there is provided a laundry system wherein hot dry air in the attic of a building is ducted to the air intake of the dryer to improve drying efficiency. Furthermore, warm moisture-laden air being exhausted from the dryer is passed through a heat exchanger in a water storage tank coupled between the water supply line and a hot water heater in the building, whereby otherwise wasted heat is reclaimed and used to preheat the water passing into the hot water heater. The cooler water in the storage tank also serves to condense the moisture in the air being exhausted from the dryer thereby to dehumidify the air before venting of the same into the building's interior space rather than to the outside. Heated drain water from a washing machine also may be directed by a thermostatically controlled valve through another heat exchanger in the water storage tank whenever the drain water temperature exceeds the temperature of the water in the tank.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a sectional view through one form of a dryer according to the present invention, such section being taken substantially along the central vertical plane of the dryer;

FIG. 2 is a fragmentary vertical section through the dryer of FIG. 1 taken substantially along the line 2-2 thereof;

FIG. 3 is a vertical section through the dryer of FIG. 1 taken substantially along the line 3-3 thereof;

FIG. 10 is a vertical section through the dryer of FIG. 9 taken substantially along the line 10-10 thereof; and FIG. 11 is a fragmentary perspective view of a dryer illustrating another feature of the invention.

DETAILED DESCRIPTION

Figure 4:
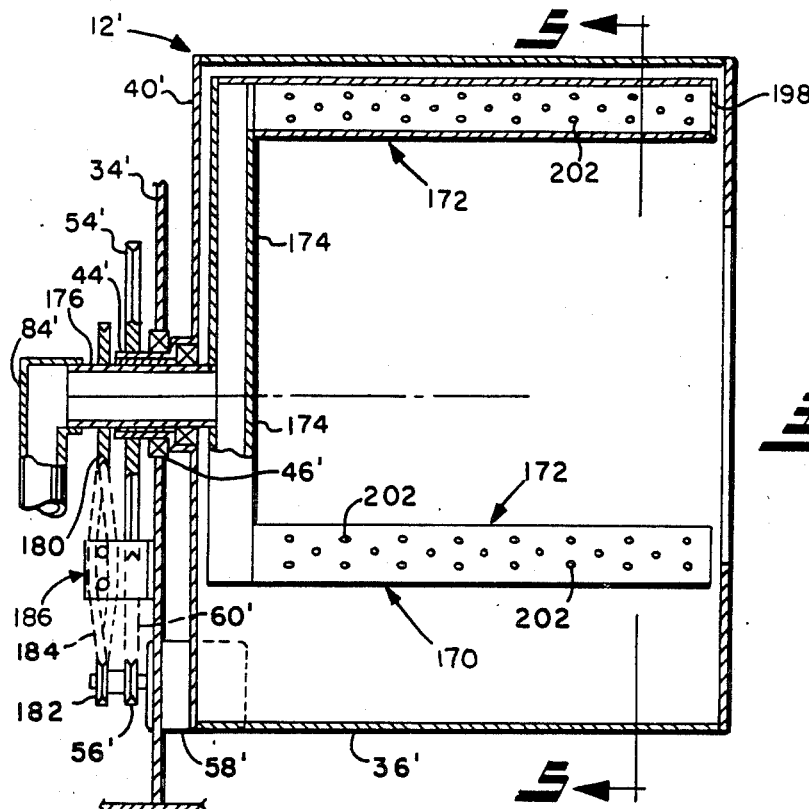
FIG. 4 is a vertical section through another form of dryer according to the invention, such being taken substantially along the central vertical plane of the dryer with only pertinent portions of the dryer being illustrated.

Referring now in detail to the drawings and initially to FIGS. 1-3, one form of clothes dryer according to the invention is designated generally by reference numeral 10. In considerable part, the clothes dryer 10 may be of conventional construction, such including a cylindrical drum 12 and an outer casing or cabinet 14 of rectilinear shape. The cabinet 14 includes a front panel 16, side panels 18, top panel 20, rear panel 22 and bottom panel or base 24. The panels may be secured to and supported by suitable framing and the top panel 20 may have mounted thereon a control housing 26.

The cabinet 14 is divided into front and rear compartments 30 and 32 by a vertical panel 34. The front compartment 30 accommodates the drum 12 which has a cylindrical side wall 36 and front and rear end walls 38 and 40. Projecting rearwardly from the drum's rear end wall 40 coaxial with the drum's horizontal axis 42 is a tubular drum shaft 44. The drum shaft 44 is journaled for rotation in a bearing 46 which is mounted in the divider panel 34 at a central opening therein, and such divider panel may be provided with stiffening ribs or the like as needed to support the weight of the drum. At its front end, the drum is further supported for rotation about its horizontal axis by a pair of roller assemblies 48 mounted on the cabinet base 24. The roller assemblies include respective rollers 50 which engage the drum's side wall 36 at opposite ends of a horizontal chord through the drum and at an elevation lower than that of the drum's axis 42. The roller assemblies in essence form a cradle in which the drum rotates.

The drum shaft 44 extends rearwardly beyond the divider panel 34 and has mounted thereon a large belt pulley 54. The pulley 54 is transversely aligned with a smaller belt pulley 56 mounted on the shaft of an electric motor 58 which may be mounted on the cabinet base 24 in offset relation to the drum as seen in FIG. 3. Trained about the pulleys 54 and 56 is a drive belt 60 which drivingly connects the drum shaft 44 to the motor 58. Accordingly, operation of the motor will rotatably drive the drum while the relatively sized pulleys 54 and 56 provide for desired speed reduction and torque amplification.

The drum shaft 44 also has mounted thereon a smaller pulley 64 which is transversely aligned with a still smaller pulley 66 mounted on the fan shaft of a blower 68. Trained about the pulleys 64 and 66 is another belt 70. Accordingly, the blower will be rotatably driven along with the drum upon operation of the motor at a speed dictated by the relative sizes of the pulleys in the drive train.

The inlet to the blower 68 is connected by a duct 74 to an air supply and heater assembly designated generally by reference numeral 76. The assembly 76 may include a gas burner 78 and an elongate mixing tube 80 of conventional type. The gas burner is located at the inlet of the mixing tube through which dilution air is drawn upon operation of the blower 68 for mixing with the hot combustion products generated by the burner. Through passages in the cabinet 14, the dilution air may be supplied from the immediate dryer environment. However, in a preferred laundry system discussed below, hot dry air may be ducted from an attic into the mixing tube inlet area which, in such system, would be closed to the immediate dryer environment. Although a gas heated dryer is illustrated, the air supply and heater assembly 76 alternatively may include an electric heating element and associated heating chamber and ducts in the case of an electrically heated dryer.

If a gas burner is employed as shown, there may be provided a gas pilot 81 which is located near the gas burner 78 and an electric igniter 82 for the gas pilot. To reduce electrical energy consumption, the igniter may operate only at the beginning of a drying cycle to light the pilot which stays lit during the drying cycle and serves to ignite the burner which may be cycled on and off during the drying cycle as dictated by a thermostatic control.

Following the path of heated air flow through the dryer 10, the blower 68 is connected to a duct 84 which has an axial portion 86 extending through the tubular drum shaft 44 for connection to a diffuser supply duct 88 located within the drum 12. The duct 88 extends radially upwardly from the drum's axis in close relationship to the drum's rear end wall 40, there however being sufficient clearance to allow rotation of the drum relative to such duct. At its upper end, such duct 88 is connected to and supports an elongate diffuser 90 which extends axially substantially the full axial length of the drum.

The diffuser 90, which is generally arcuate or banana shape in transverse cross section as seen in FIG. 2, has a convexly curved, radially inner or bottom wall 94 facing downwardly and a convexly curved, radially outer or upper wall 96 which is joined at its longitudinal edges to respective longitudinal edges of the bottom wall to form a plenum chamber 98. The diffuser also has end walls 100 and 102 closing opposite ends of the chamber 98 and an opening 104 in the bottom wall 94 which effects communication between the duct 88 and chamber 98. The bottom wall of the diffuser also has a plurality of small openings or diffuser outlets 106 spaced along its axial length and across its transverse width. Such outlets serve to direct air flow from the chamber 98 downwardly against clothing being tumbled in the drum uniformly over the axial length of the drum.

As seen in FIGS. 1 and 2, the top wall 96 of the diffuser is radially inwardly spaced from the cylindrical side wall 36 of the drum 12 to allow for passage, during rotation of the drum relative to the diffuser, of one or more baffles 110 affixed to and extending axially along the drum's side wall. Such baffles 110 are provided to enhance the tumbling action of clothing in the drum when rotated.

With further reference to FIGS. 1 and 2, the drum 12 can be seen to have a central circular opening 114 in its front end wall 38 which is coextensive with an opening or port 116 provided in the front panel 16 of the cabinet 14. The cabinet port 116 may be opened and closed by a door 118 which is hinged to the front cabinet panel for opening and closing movement. The door 118, which normally will be closed during dryer operation, may be opened to allow clothing to be placed in or removed from the drum through the opening 114 and port 116.

When closed, the door 118 forms a planar continuation of the front cabinet panel 16 which is spaced from the front end wall 38 of the drum 12. Mounted on the back side of the door 118 is a semicircular cradle or holder 124 for a circular lint filter or trap 126. The lint trap 126 includes an inwardly concave screen or filter element 128 which serves to remove and trap any lint that may be entrained in the air flow exiting the drum through the drum opening 114. When the door is closed, the annular peripheral edge of the lint trap 126 will be located closely adjacent the periphery of the drum opening 114 so that substantially all air flow exiting the drum will pass through the screen 128 before passage into an outer chamber 130 which substantially envelops the drum within the front cabinet compartment 30.

The chamber 130 is interiorly defined by the drum 12 and outwardly by corresponding portions of the cabinet panels 16, 18, 20 and 34 which preferably have insulation 131 affixed to their interior sides to prevent against heat loss. In addition, the chamber 130 is substantially isolated from the lower part 132 of the front cabinet compartment 30, which may house the motor 58 and heater assembly 76, by elongate closure plates 134. The closure plates 134 have their outer longitudinal edges fixed to respective cabinet panels and their inner longitudinal edges positioned close to adjacent corresponding walls of the drum. The closure members, however, are sufficiently spaced from the drum to allow for drum rotation and wiper elements or the like may be affixed to such closure members to span the resultant gap to prevent passage of air from the chamber 130 to the lower part 132 of the front compartment 30.

At the upper rear of the outer chamber 130, the divider panel 34 is provided with an opening 140 through which air flow is exhausted from such chamber. Connected to the divider panel 34 at such opening is a vent duct 142 which extends rearwardly and through an opening 144 in the rear panel 22. The vent duct 142 at its rear or exit end may be coupled to an exhaust duct which may lead, for example, to the outside.

Within the vent duct 142, there is provided a clogged filter detector including a flapper 148 which may be made of lightweight metal or plastic. The flapper is pivotally mounted at its upper end to the top of the vent duct by a pivot 150 for free swinging movement between its illustrated solid line and phantom line positions. Accordingly, by its own weight, the flapper is biased to its solid line or vertical position. When in such vertical position, the flapper will substantially close the air flow path through the vent duct, such flapper having a diameter or transverse dimension closely corresponding to the inside diameter or transverse dimension of the duct. It also is noted that such flapper accordingly will substantially or almost completely stop the escape of preconditioned room air through the vent duct to the outside when the dryer blower is idle, such providing additional energy savings.

The clogged filter detector also includes a switch 154 which is mounted to the top of the vent duct to the rear of the flapper pivot 150. The switch has a plunger or lever 156 disposed to be actuated by the flapper 148 when such flapper is in its phantom line position.

In addition to the aforedescribed components, suitable control circuitry and components are provided to effect controlled operation of the drum. Such components may include, for example, a timer 157 which sequences the dryer through a drying cycle or selected one of a number of different drying cycles. A start switch 158 and drying temperature selector switch 159 also may be provided along with other conventional dryer circuit components such as a door open interrupt switch.

To use the dryer, wet clothing may be placed in the drum 12 which interiorly defines the drying chamber of the dryer. With the door 118 closed, a drying cycle may be commenced as by setting the timer 157 and pressing the start switch 158. During the drying cycle, the motor 58 will be energized to rotate the drum and drive the blower 68 which generates air flow through the dryer, the air being supplied from and heated by the air supply and heater assembly 76.

Air flow forced by the blower 68 is directed by the ducts 84 and 88 to the chamber 98 in the diffuser 90. From there, the heated air flow is directed downwardly by the diffuser outlets 106 against the clothing being tumbled in the dryer to promote rapid drying, i.e., rapid evaporation of moisture from the clothing. Moisture laden air passing out of the drum through the drum opening 114 will pass through the lint trap 126 and into the outer chamber 130 for exhausting through the vent duct 142. As the air passes through the lint trap, lint entrained therein will be captured.

If the lint trap is relatively clean or unclogged, air flow through the dryer upon start-up will be sufficient to urge the flapper 148 to its phantom line position seen in FIG. 1 whereupon the switch 154 will be actuated. Thereafter, the flapper will be held in such switch actuating position as long as air flow is not degraded to an unacceptable level by a substantial accumulation of lint in the lint trap. However, when there is a substantial accumulation of lint or other obstruction in the air flow path through the dryer, air flow will become substantially impeded with the result that air flow through the vent duct 142 will be insufficient to maintain the flapper 148 in its switch actuating position. Consequently, the flapper will drop away from the switch which in turn will generate a signal indicating a clogged filter or other obstruction to flow.

The switch 154 may be of the normally closed type and connected in circuit with an indicator light 160 provided on the control housing 26 as seen in FIG. 2. As long as the switch is actuated by the flapper 148, the switch will be held open and the light will remain off. However, upon deactuation or closure of the switch, the light will be illuminated to provide a visual indication that the lint trap has become clogged and requires cleaning. Alternatively or additionally, the switch may be connected in circuit with a buzzer 162 (FIG. 2) or the like which generates an audible alarm upon deactuation of the switch 154. In another arrangement, the switch may be connected in the main power circuit of the dryer so as to stop dryer operation upon deactuation. As will be appreciated, a timer may be associated with the switch so as to allow time for the flapper 148 to assume its switch actuating position upon dryer start-up to avoid false signals and/or to allow dryer start-up. Of course, alternative arrangements may be provided, it being the purpose of the clogged filter detector either to provide a visual indication of the lint trap's condition or to effect appropriate control or shut-down of the dryer when the filter is clogged and requires cleaning. It also is noted that the detector will be responsive to other adverse conditions which substantially impede or adversely affect air flow through the dryer such as clogging in any of the associated air flow ducts or upon failure of the blower 58.

Figure 5:
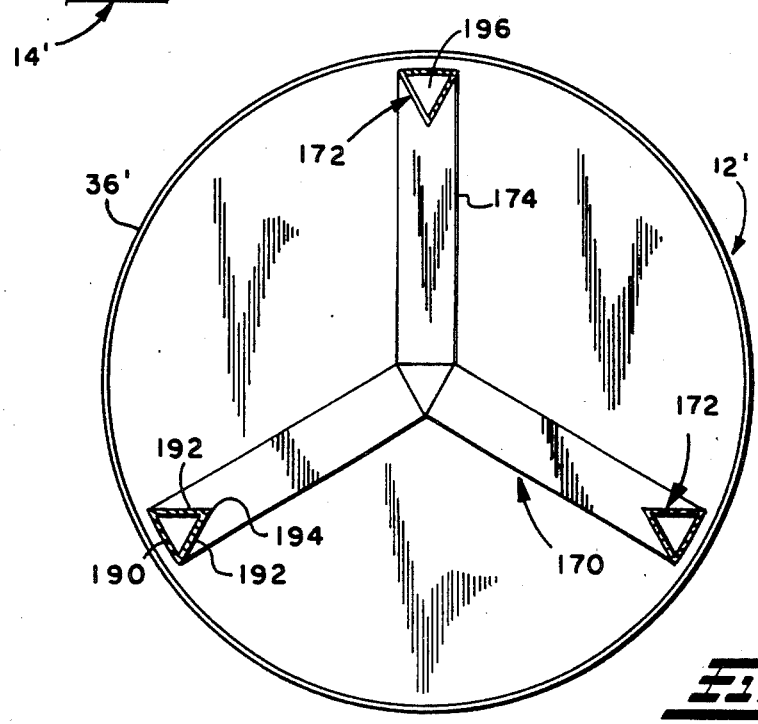
FIG. 5 is a vertical section through the dryer of FIG. 4 taken substantially along the line 5-5 thereof.

FIGS. 4 and 5

Another form of diffuser according to the invention is designated generally by reference numeral 170 in FIGS. 4 and 5, wherein primed reference numerals designate elements corresponding generally to those identified above by the same unprimed reference numerals. Like the diffuser 90, the diffuser 170 is located inside the dryer drum 12' which may be rotatably mounted in the front compartment of the cabinet 14' in a manner similar to that which is shown in FIGS. 1-3. As seen in FIG. 4, the drum 12' has a drum shaft 44' journaled for rotation in a bearing 46' which is mounted in the divider panel 34' of the cabinet 14'.

The diffuser 170 includes at least one and preferably a plurality of axially elongate hollow baffles 172 which are connected to and supported by respective radially extending ducts 174. At their radially inner ends, the ducts 174 are joined together and to an axially extending duct 176 which extends through the tubular drum shaft 44'. The duct 176 extends axially beyond the drum shaft and into a diffuser supply duct 84' which is connected at its other end to a blower in a manner similar to that shown in FIGS. 1-3. If desired, any suitable means may be provided to seal any space between the union of the duct 176 and supply duct 84' while allowing for rotation of the duct 176 relative to the duct 84'.

On that portion of the duct 176 extending between the supply duct 84' and drum shaft 44', there is mounted a pulley 180 which is transversely aligned with a smaller pulley 182 mounted on the shaft of the electric motor 58'. The pulley 182 is in addition to the pulley 56' which is drivingly connected by the belt 60' to the drum shaft pulley 54'. Trained about the pulleys 180 and 182 is a belt 184 which is twisted to form a figure eight whereby the duct 176 will be rotated in a direction opposite to that of the drum shaft 44' upon operation of the motor. If desired, a spacer pulley assembly 186 may be provided to prevent rubbing of the belt 184 at its overlap.

Referring now more particularly to the diffuser 170, the ducts 174 are positioned close to the drum's rear end wall 40', there however being sufficient clearance to allow relative rotation between such ducts and the drum 12'. At their radially outer ends, the ducts 174 are connected to the baffles 172 which extend axially substantially the full axial length of the drum. As shown, each baffle has a generally triangular cross-sectional shape, such being formed by a radially outer wall 190 and two relatively inclined side walls 192 which are joined at a vertex 194. The walls together form an axially elongate plenum chamber 196 which is closed at its front end by an end wall 198. The radially outer wall 190 is outwardly convexly curved to match the curve of the drum's cylindrical side wall 36' and further is closely positioned to such side wall to prevent clothing from being caught between the baffle and the drum upon their relative rotation. If desired, suitable sealing strips may be mounted to the baffles so as to contact the inner surface of the drum to ensure that clothing is not caught between the rotating baffles and the inner surface of the drum.

The side or generally radially inwardly projecting walls 192 of each baffle 172 are provided with a plurality of small openings or diffuser outlets 202 spaced along their axial lengths and across their transverse widths. Such outlets serve to direct air flow from the diffuser chamber 196 towards and against clothing being tumbled in the drum by rotation of the baffles relative to the drum. This arrangement greatly promotes rapid drying of clothing in the drum.

The diffuser 170 may be utilized in other arrangements than as illustrated. For example, the diffuser baffles 172 may be collectively rotated in a stationary drum. Accordingly, the diffuser baffles by themselves will effect the desired tumbling action of the clothing. On the other hand, the diffuser baffles may be stationary while the drum is rotated. Advantageous results also may be obtained by fixing the diffuser baffles to the drum for common rotation therewith. Accordingly, a separate drive for the diffuser may be eliminated.

FIG. 6

Figure 6:
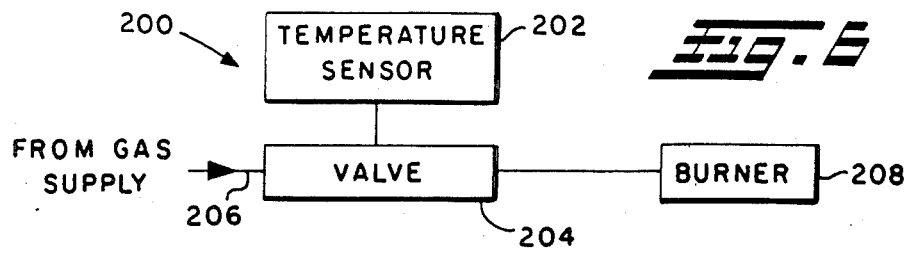
FIG. 6 is a diagrammatic illustration of a dryer temperature control system according to the invention.

Referring now to FIG. 6, a gas dryer temperature control system according to the invention is diagramatically illustrated and designated by reference numeral 200. The system 200 includes a temperature sensor 202 which monitors the temperature in the drying chamber of the dryer. In the FIG. 1 embodiment, such temperature sensor 202 could be mounted within the drum 12 on the duct 88 and connected to the control panel 26 by a line 203 passing through the duct 86. The temperature sensor 202 is connected to a thermostatically modulated gas control valve 204 connected in the gas supply line 206 leading to the dryer's burner 208. In operation, the gas control valve regulates the quantity of fuel supplied to the burner for combustion in reverse proportion to sensed temperature, thereby correspondingly modulating the heat input rate of the dryer's air heater.

As will be appreciated, the system 200 serves to maintain a desired steady state temperature inside the drum to obtain an improvement in drying efficiency while preventing excess heating of clothing, particularly during the latter part of the drying cycle. A relatively high heat input rate can be tolerated when the clothing in the dryer contains substantial moisture as at the start of the drying cycle. Such high heat input rate is desirable to maximize the drying rate during the initial portion of the cycle. However, as the clothing dries, it will become less tolerant to high temperatures. With the present system, the gas control valve 204, in response to the resultant increase in temperature sensed by the temperature sensor 202, will proportionately decrease the gas flow rate to burner 208 thereby to maintain the desired steady state temperature. Such arrangement provides numerous advantages over conventional systems wherein intermittent heat is supplied by a cycling burner, one being the prevention of 'harsh' or overheated drying.

Although shown and described for use in a gas dryer, the system 200 may be modified for use in an electric dryer. In this case, the gas control valve 204 would be replaced, for example, by a current regulator which controls the current being supplied to the dryer's heating element in reverse proportion to sensed temperature. In either case, the valve or regulator 204 operates to maintain a desired temperature in the drying chamber on a steady state basis. The temperature sensor 202 also may be coupled into a safety limit temperature control circuit which disables dryer operation upon an excessive temperature being reached by reason of a system failure.

FIG. 7

Figure 7:
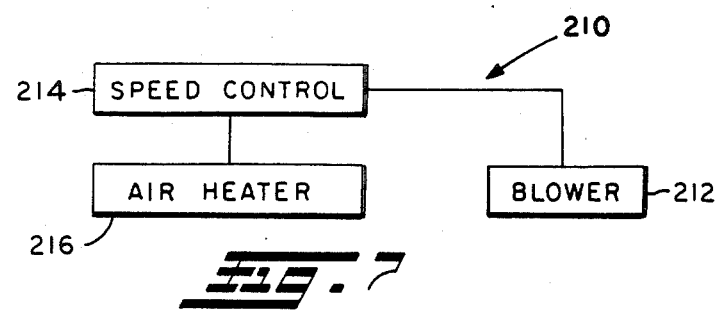
FIG. 7 is a diagrammatic illustration of another dryer temperature control system according to the invention.

In FIG. 7, another temperature control system according to the invention is designated generally by reference numeral 210. In such system, there is provided a multi-speed or variable speed blower 212 and a control 214 therefor. The control 214 is connected to the dryer's air heater 216 which operates or cycles between on and off conditions in conventional manner to maintain the air temperature within a desired range. When the air heater is on, the control 214 operates the blower 212 at a high speed while at other times, the control operates the blower at a low speed.

FIG. 8

Figure 8:
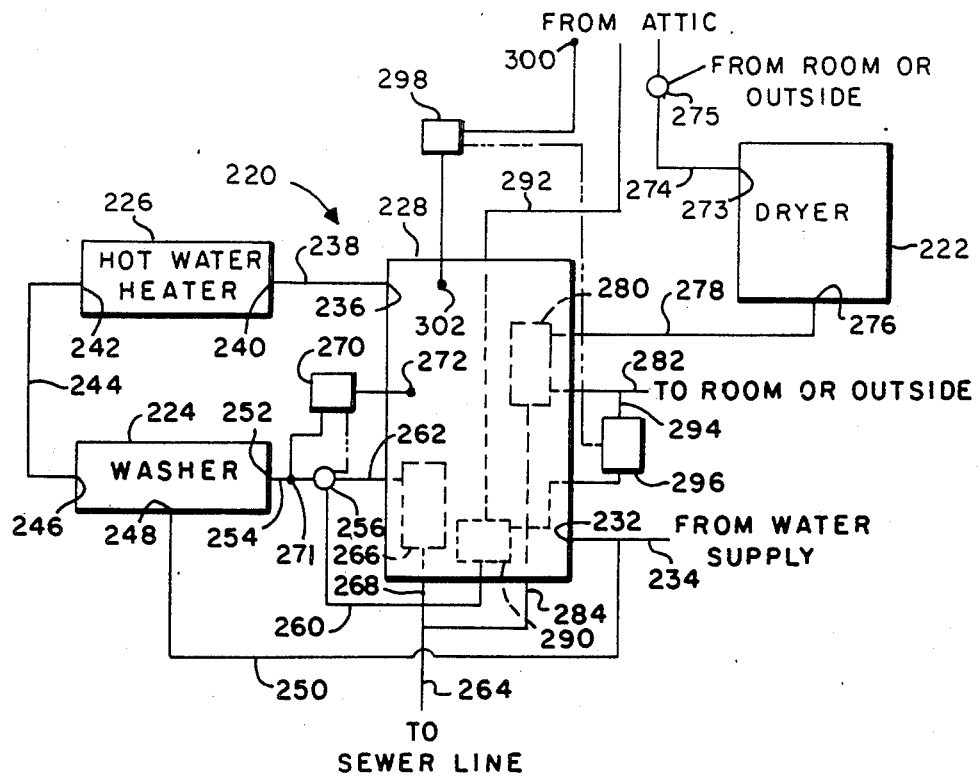
FIG. 8 is a diagrammatic illustration of a laundry system according to the present invention.

In FIG. 8, a laundry system according to the invention is diagramatically illustrated and designated generally by reference numeral 220. The laundry system 220 may be employed in commercial and residential buildings and particularly in buildings having an attic wherein hot dry air accumulates. As shown, the laundry system generally comprises a clothes dryer 222, clothes washer 224, hot water heater 226 and water storage tank 228, which all are desirably located in close proximity to one another within the building. Except as otherwise indicated, the dryer, washer and heater may be of any type.

The water storage tank 228 has an inlet 232 connected to the building's water supply line 234 and an outlet 236 connected by line 238 to the inlet 240 of the hot water heater 226. At its outlet 242, the hot water heater is connected by a line 244 to the hot water inlet 246 of the washer 224. The washer also has a cold water inlet 248 connected by line 250 to the water supply line 234, and a drain 252 connected by line 254 to the inlet of a solenoid operated, three-way valve 256.

The valve 256 has two outlets respectively connected to lines 260 and 262. The line 260 leads to the drain or sewer line 264 of the building whereas the line 262 is connected to the inlet of a heater exchanger 266 located within the water storage tank 228. The heat exchanger may be of conventional fluid/fluid type and has its outlet connected by line 268 to the sewer line 264. The valve accordingly will operate to direct drain water from the washer either directly to the sewer line 264 or indirectly via the heat exchanger 266.

Operation of the valve 256 is effected automatically by a thermostatic control 270 including temperature sensors 271 and 272 which sense water temperature in the line 254 and in the storage tank 228, respectively. When the temperature of water in line 254 exceeds the temperature of water in the storage tank, the control 270 operates the valve 256 to direct washer drain water through the heat exchanger 266. Otherwise, the valve 256 connects line 254 to line 260 thereby to bypass the heat exchanger. Accordingly, otherwise wasted heat from the washer's drain water is reclaimed and used to preheat the water being supplied from the water storage tank to the hot water heater 226, thus reducing the amount of energy otherwise required by the hot water heater to raise the temperature of relatively cold water in water supply line 234 to desired temperature in the hot water heater.

Referring now to the dryer 222, such has an air supply inlet 273 connected by a duct 274 to the building's attic. As previously indicated, the dryer's air supply inlet may be closed to the dryer's immediate environment so that only air supplied by the duct 274 is drawn through the dryer for drying purposes. If desired, the duct may be provided with a flapper valve 275 or the like to provide for selective connection of the dryer to the attic or to another air source. When attic air conditions are not satisfactory, the flapper valve 275 may be switched so that the dryer intakes air from outside the building or from the immediate dryer environment.

By supplying air to the dryer from the attic or outside the building, a number of advantages are obtained, e.g., no development of negative pressure in the conditioned environment of the building which consequently causes drafts and no additional energy consumption required to condition replacement air to desired ambient temperature. Moreover, the use of hot dry attic air or other solar heated air reduces the amount of energy consumed by the dryer to raise the temperature of supply air to desired temperature for use in the dryer.

Further in accordance with the invention, the dryer's exhaust vent 276 is connected by a duct 278 to a gas/liquid heat exchanger 280 located within the water storage tank 228. The heat exchanger 280 serves to effect transfer of heat from the dryer's hot exhaust to the water held in the water storage tank prior to the air being discharged via an exhaust duct 282 to the outside or the dryer's immediate environment. Connected to the lower end of the air passage through the heat exchanger 280 is a drain line 284 which directs any condensate to the building's sewer line. As will be appreciated, the passage of the dryer's hot moist exhaust through the heat exchanger will serve to dehumidify the air prior to its passage, for example, into the dryer's immediate environment.

Also provided is another gas-liquid heat exchanger 290 located within the water storage tank 228 which has its inlet connected by a duct 292 to the attic and its outlet connected by a duct 294 to the exhaust vent 282. In line with the duct 294 is a blower 296 which is operated by a thermostatic control 298 including temperature sensors 300 and 302 respectively located in the attic and in the storage tank 228. When the attic air temperature exceeds the temperature of the water in the storage tank, the control 298 operates the blower to draw attic air through the heat exchanger 290 for transfer of heat from such air to the water in the storage tank. The gas-liquid heat exchanger 290 may consist of a serpentine air duct lying on the bottom of the water storage tank which is equipped with a drain for any condensate.

Figure 9:
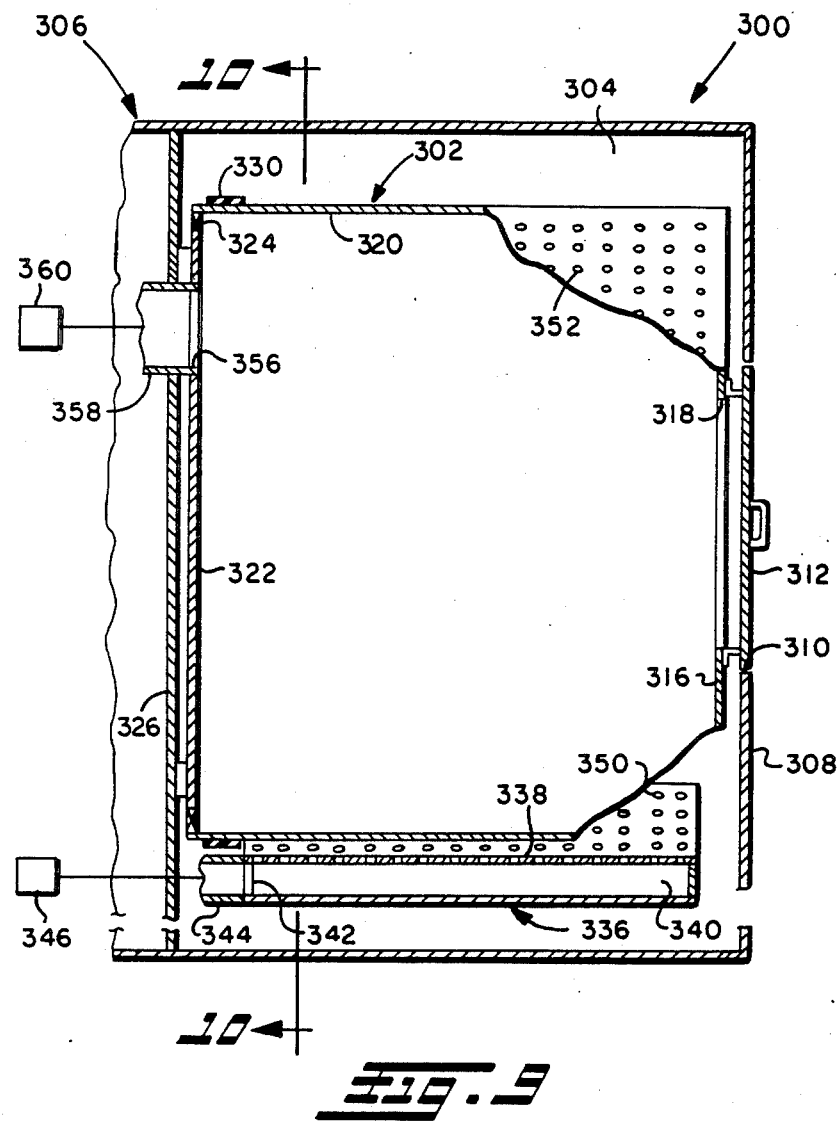
FIG. 9 is a vertical section through still another form of dryer according to the invention, such being taken substantially along the central vertical plane of the dryer with only pertinent portions of the dryer being illustrated.

FIGS. 9 and 10

In FIGS. 9 and 10, pertinent portions of another dryer embodiment according to the invention are indicated generally at 300. The dryer 300 includes a cylindrical drum 302 which is housed in the front compartment 304 of a cabinet 306. The front panel 308 of the cabinet 306 has a central opening 310 which is opened and closed by a door 312 suitably hinged to the front panel 308 for opening and closing movement. When the door 312 is in its closed position, the compartment 304 is substantially or entirely sealed to the outside except as noted below.

The drum 302 has a front end wall 316 provided with an opening 318 coextensive with the opening 310 in the front panel 308 of the cabinet 306. The front end wall 316 is peripherally joined to a cylindrical side wall 320 which is perforated over its entire peripheral extent. The drum 302 is further formed by a rear end wall 322. Unlike conventional drums, the cylindrical side wall 320 is mounted for rotation on its axis on the circular rear end wall 322 by means of a peripheral bearing assembly 324. Consequently, the cylindrical side wall and front end wall can rotate relative to the rear end wall which is fixedly secured to a vertical support panel 326 of the cabinet 306.

As illustrated, rotation of the drum 302 is effected by a friction drive belt 330 which is trained around the side wall 320 and a drive pulley 332 mounted on the shaft of an electric motor 334. It further is noted that any suitable means may be provided to rotatably support the front end of the drum to reduce moment forces on the bearing assembly 324.

Below the drum 302 there is provided a jacket 336 which is generally arcuate in transverse cross section as seen in FIG. 10. The jacket 336 has a concave top wall 338 facing upwardly and located closely adjacent the outer diameter of the drum side wall 320. The jacket further has bottom and end walls defining with the top wall 338 a plenum chamber 340 which is connected at an opening 342 to a duct 344 which in turn is connected to a source of heated air diagramatically indicated at 346.

As shown, the top wall 338 is perforated by means of openings 350 over its entire arcuate extent. Consequently, air flow exiting through the openings 350 is directed upwardly towards the side wall 320 of the drum for passage into the interior of the drum through the openings or perforations 352 in the drum side wall 320.

The dryer 300 further is provided with an exhaust opening 356 in the stationary rear wall 322 of the drum 302. In communication with the opening 356 is an exhaust vent 358 which may be connected to a blower diagramatically illustrated at 360. The blower in turn can be connected by a suitable exhaust duct to the outside, heat exchanger, etc.

In operation, the motor 334 is operated to rotate the drum to effect tumbling action of clothes positioned therein. In addition, the blower 360 is operated to exhaust moisture laden air from the interior of the drum via the opening 356 and vent duct 358. As negative pressure is developed inside the drum 302, the jacket 336 will supply heated air from the source 346 thereof for drying the clothing contained and being tumbled inside the drum 302. As will be appreciated, the diffuser directs the heated air into the lower portion of the drum where the clothing normally resides while moisture laden air is exhausted from the upper portion of the drum through the vent duct 358. If desired, the blower alternatively may be located upstream of the jacket 336, such blower operating to force heated air into the jacket for passage into the drum and ultimate exhausting via the vent duct 358.

FIG. 11

Referring now to FIG. 11, another feature of the invention is illustrated. As shown, a removable arcuate screen 370 may be provided to prevent deposition of lint on moving parts located in the lower portion of the dryer such as an electric motor and associated pulleys, gears, etc. The screen is insertable through an opening 372 in the front panel 374 of the dryer cabinet 376 for positioning slightly below the outer surface of the dryer drum 378. When thusly positioned, the screen closes off and covers the lower portion of the clothes dryer housing the motor and other moving parts. The screen 370 also may serve to protect against lint being drawn into an air heater assembly having its inlet located in the lower portion of the clothes dryer.

Although the invention has been shown and described with respect to preferred embodiments, it is obvious that equivalent alterations or modifications will occur to others skilled in the art upon the reading and understanding of the specification. It further is noted that many of the features of the invention, although shown in separate embodiments or illustrations, may be employed in combination with other features together to provide for improved efficiency and performance. The present invention includes all such equivalent alterations and modifications, and is limited only by the scope of the following claims.

What is claimed is:

1. A clothes dryer comprising a housing, a cylindrical drum in said housing for receiving wet clothing, means for tumbling the wet clothing in said drum, blower means for generating air flow through said drum, heater means for heating the air prior to passage through said drum, and diffuser means located in said drum for receiving the heated air and discharging it into said drum against the wet clothing at a plurality of locations spaced along the axial length of said drum, said diffuser means being located in the uppermost portion of said drum and having a plurality of downwardly directed air outlets.

2. A dryer as set forth in claim 1, wherein said diffuser means uniformly discharges the heated air over substantially the full axial length of said drum.

3. A dryer as set forth in claim 1, wherein said diffuser means includes at least one axially elongate hollow baffle extending radially inwardly from an inside cylindrical wall of said drum over substantially the full axial length of said drum, said baffle having an inlet at one end thereof for receiving the heated air and a plurality of discharge holes spaced along its axial length for directing the heated air into said drum.

4. A dryer as set forth in claim 3, wherein said means for tumbling includes means for effecting relative rotation between said baffle and said drum about a common axis.

5. A dryer as set forth in claim 3, wherein said baffle has a bottom wall extending substantially the length thereof, said bottom wall including said plurality of discharge holes.

6. A dryer as set forth in claim 3 wherein said baffle has a convexly curved, upwardly facing outer surface.

7. A dryer as set forth in claim 1, wherein said drum is mounted for rotation by means of a tubular drum shaft, and said diffuser means receives the heated air from a duct passing through said tubular drum shaft.

8. A dryer as set forth in claim 7, wherein said diffuser means is connected to said duct by another duct extending radially within said drum.

9. A dryer as set forth in claim 1, wherein said diffuser means terminates short of at least one axial end of said drum.

10. A dryer as set forth in claim 1, further comprising heater means for heating the air prior to passage through said drum, and regulating means for proportionately modulating said heater means between high and low heat input rates in response to sensed temperature inside said drum.

11. A dryer as set forth in claim 10, wherein said heater means includes a gas burner, and said regulating means includes a temperature sensor for sensing the temperature inside said drum and gas control valve means modulated by said sensed temperature.

12. A dryer as set forth in claim 1, further comprising heater means for heating the air prior to passage through said drum, heater control means for cycling said heater means on and off, and blower control means for operating said blower means at a high speed when said heater means is on and at a low speed when said heater means is off.

13. A clothes dryer comprising a housing, a drying chamber in said housing for receiving wet clothing, blower means for generating air flow through the dryer, vent means for exhausting such air flow externally of said housing, air passage means for directing such air flow into said drying chamber and then out of said drying chamber to said vent means, filter means in said air passage means downstream of said drying chamber for removing entrained lint from such air flow, said air passage means including downstream passage means for directing essentially all of such air flow passing from said filter means to said vent means, and clogged filter detector means responsive to the rate of air flow through said downstream passage means for generating an output signal indicative of a clogged filter when the rate of air flow drops below a predetermined level, said detector means including flapper means mounted in said vent means for positional movement in response to the force of air flow acting thereagainst, and a switch actuated by said flapper means when the rate of air flow is greater than said predetermined level, and said flapper means in the absence of such air flow being biased to a position substantially closing said vent means, and means for generating an alarm signal in response to said output signal.

14. A clothes dryer comprising a housing, a cylindrical drum in said housing for receiving wet clothing, means for tumbling the wet clothing in said drum, blower means for generating air flow through said drum, heater means for heating the air prior to passage through said drum, diffuser means located in said drum for receiving the heated air and discharging it into said drum against the wet clothing at a plurality of locations spaced along the axial length of said drum, drive means in the lower portion of said housing operative to rotate said drum, and a screen interposed between said drum and said drive means to prevent deposition of lint on said drive means.

* * * * *